United States Patent [19]

Ledamoisel et al.

[11] Patent Number: 5,293,952
[45] Date of Patent: Mar. 15, 1994

[54] HYDRAULIC FLUID SUPPLY SYSTEM FOR AN INSTALLATION IN A MOTOR VEHICLE HAVING POWER ASSISTED STEERING WITH A PRESSURE REGULATION VALUE CONNECTED TO THE MAIN AND SECONDARY CIRCUITS

[75] Inventors: Claude Ledamoisel, Bessancourt; Robert Michel, Mery-Sur-Oise; Véve R. Randriazanamparany, Rueil Malmaison, all of France

[73] Assignee: Valeo, Paris, France

[21] Appl. No.: 803,556

[22] Filed: Dec. 9, 1991

[30] Foreign Application Priority Data

Dec. 7, 1990 [FR] France .................. 90 15360

[51] Int. Cl.⁵ .......................................... B63D 5/07
[52] U.S. Cl. .................... 180/132; 60/418; 60/435; 60/436; 137/101; 137/117; 180/141; 180/142
[58] Field of Search ............ 180/132, 141, 142; 60/435, 436, 418; 137/118, 101, 117

[56] References Cited

U.S. PATENT DOCUMENTS

| | | | |
|---|---|---|---|
| 3,575,192 | 4/1971 | MacDuff | 137/118 |
| 3,640,301 | 2/1972 | Jania . | |
| 3,692,039 | 9/1972 | Ewald et al. | 137/118 |
| 3,915,186 | 10/1975 | Thomas | 137/101 |
| 4,084,604 | 4/1978 | Budecker et al. | 137/101 |
| 4,414,883 | 11/1983 | Dauvergue . | |
| 4,566,477 | 1/1986 | Barker et al. | 137/101 |

FOREIGN PATENT DOCUMENTS 2331704 6/1975 Fed. Rep. of Germany .
3626531 2/1988 Fed. Rep. of Germany .
2387401 11/1978 France .

Primary Examiner—Mitchell J. Hill
Attorney, Agent, or Firm—Longacre & White

[57] ABSTRACT

The steering of a motor vehicle is assisted by a power steering means including a hydraulic distributor which is supplied with pressurized fluid by a pump from a reservoir. The vehicle also has a clutch having hydraulic servo assistance supplied by a servo unit. The distributor of the power steering system and the clutch servo unit are both supplied with hydraulic fluid from the same pump and reservoir, through a distribution unit which is so arranged that the power steering system has first call at all times on the available pressurized fluid. The distributor unit includes a flow distributing valve, fed from the pump and dividing the flow between a main circuit which leads to the steering distributor, and a secondary circuit which leads to the servo unit. A pressure regulating valve is connected to both the main circuit and the secondary circuit so as to regulate the pressure in each of these circuits according to the demand of the power steering system.

13 Claims, 7 Drawing Sheets

5,293,952

HYDRAULIC FLUID SUPPLY SYSTEM FOR AN INSTALLATION IN A MOTOR VEHICLE HAVING POWER ASSISTED STEERING WITH A PRESSURE REGULATION VALUE CONNECTED TO THE MAIN AND SECONDARY CIRCUITS

FIELD OF THE INVENTION

This invention is concerned generally with the supply of a hydraulic control fluid under pressure to fluid actuated systems, such as servo systems, in a motor vehicle, where the vehicle has power assisted steering and a further installation which is servo assisted. In particular the invention is concerned with the case in which the power assistance for the steering is supplied from a hydraulic power source comprising a fluid reservoir and a fluid pressurized means working in the reservoir.

BACKGROUND OF THE INVENTION

In such an apparatus the source of pressurized fluid (hydraulic power) is quite expensive. For this reason, when a vehicle has power assisted steering, as for example described in the specification of French published patent application FR 2 448 472A which corresponds to U.S. Pat. No. 4,414,883, it is desirable to use the hydraulic power source of the pressurized fluid in the power steering system for also supplying fluid to the servo means in another installation on the vehicle, such as a servo assisted clutch. However, this gives rise to a problem due to the fact that the supply of the servo means must not be such as to disturb the operation of the power assisted steering in any way.

DISCUSSION OF THE INVENTION

An object of the present invention is to overcome these problems by providing fluid supply apparatus which uses the source of the fluid pressure which is provided for the power assisted steering system to feed, in addition, the servo means of another installation in the vehicle, but without in any way perturbing the operation of the steering.

In accordance with the invention, apparatus for supplying a hydraulic fluid to servo means for an installation in a motor vehicle having hydraulic power assisted steering, of the kind having a hydraulic power source comprising a reservoir and fluid pressurized means working in the reservoir for supply of fluid under pressure to the servo means, is characterized in that the hydraulic power source means supplies both the servo means and the hydraulic distributor of the hydraulic power steering system of the motor vehicle, with a hydraulic fluid supply distribution unit being interposed between the hydraulic power source and the distributor of the hydraulic power assisted steering means system, the distribution unit comprising a flow distributing means supplied from the central hydraulic power steering means for dividing the flow into a main stream flowing in a main circuit for supply to the hydraulic power assisted steering system and a secondary stream flowing in a secondary circuit for supply to the servo means, and a pressure regulating means being connected to the main circuit and to the secondary circuit for regulating the pressure of the main and secondary streams in accordance with the demand of the hydraulic power assisted steering system.

In a system according to the invention therefore, the hydraulic power, or fluid pressure, source is common to both the servo means for the clutch or other installation and the power steering, thus reducing the cost. In addition, the hydraulic power source runs no risk of being perturbed in operation by the servo means, and in particular by the pressure prevailing in the secondary circuit, this being due in particular to the pressure regulating means.

In addition, when the supply of pressurized fluid is not sufficient for the requirements of the hydraulic power assisted steering system, the flow distributing means is used for closing a passage that communicates with the secondary circuit, in such a way that the power steering takes priority so that the total supply of fluid is directed to the power steering, which then receives sufficient fluid flow regardless of the pressure conditions prevailing.

In one embodiment, the pressure regulating means and flow distributing means each comprise a valve member. The valve member of the flow distributing means is provided with a calibrated orifice so as to ensure that a predetermined flow of fluid circulates in the main circuit.

According to a preferred feature of the invention, the secondary circuit continues beyond the pressure regulating means so as to communicate with a connecting-/disconnecting means which includes a resilient diaphragm. This connecting/disconnecting means is connected to a pressure accumulator through a non-return valve, such connection being controlled by an isolating valve for the accumulator. This arrangement enables the supply pressure for the servo means to be maintained between two predetermined values.

The hydraulic fluid supply distribution unit is preferably in the form of a housing which consists of a block in the shape of a parallelepiped, containing the pressure regulating means, the flow distributing means and the connecting/disconnecting means, with all of these three devices extending parallel to each other and at right angles to the pressure accumulator and its isolating valve. With this arrangement, the block is made very compact.

In accordance with a further feature of the invention, the connecting/disconnecting means is formed with a blind hole into which the bore associated with the flow distributing means is open. This arrangement is conducive to easy formation (by drilling or otherwise) of the various ducts within the block which bring its various components into communication with each other.

A preferred embodiment of the invention will now be described, by way of example only and with reference to the accompanying drawings.

DESCRIPTION OF A PREFERRED EMBODIMENT OF THE INVENTION

Figure 1:
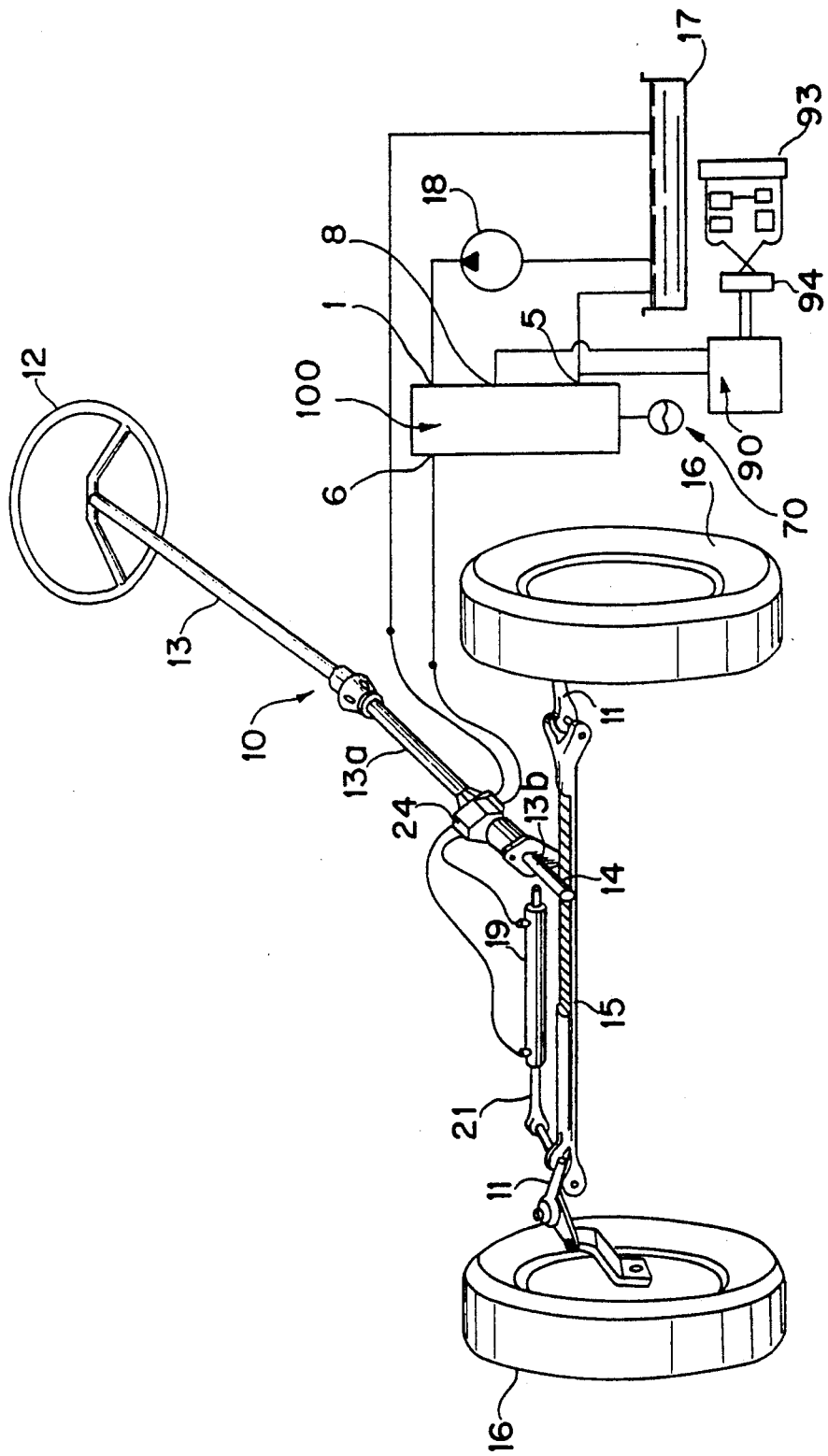
FIG. 1 is a diagrammatic perspective view of a hydraulic power steering system with the hydraulic fluid distribution means in accordance with the present invention.

FIG. 1 shows a power assisted steering system for a motor vehicle, including steering control means 10 acting on means for setting the steering direction, such as steering arms 11. The steering control means 10 comprise a steering wheel 12 and a steering column 13 in the usual way. The latter consists of two aligned shafts 13A and 13B, arranged with a limited relative clearance which enables the two columns 13A and 13B to have an angular offset between them under the action of the steering wheel 12. The upper shaft 13A of the steering column is fixed to the steering wheel 12, while its lower shaft 13B is fixed to a pinion 14 which meshes with a rack 15. The latter contributes to the orientation of the steering road wheels 16 of the vehicle, through the steering arms 11.

Figure 2:
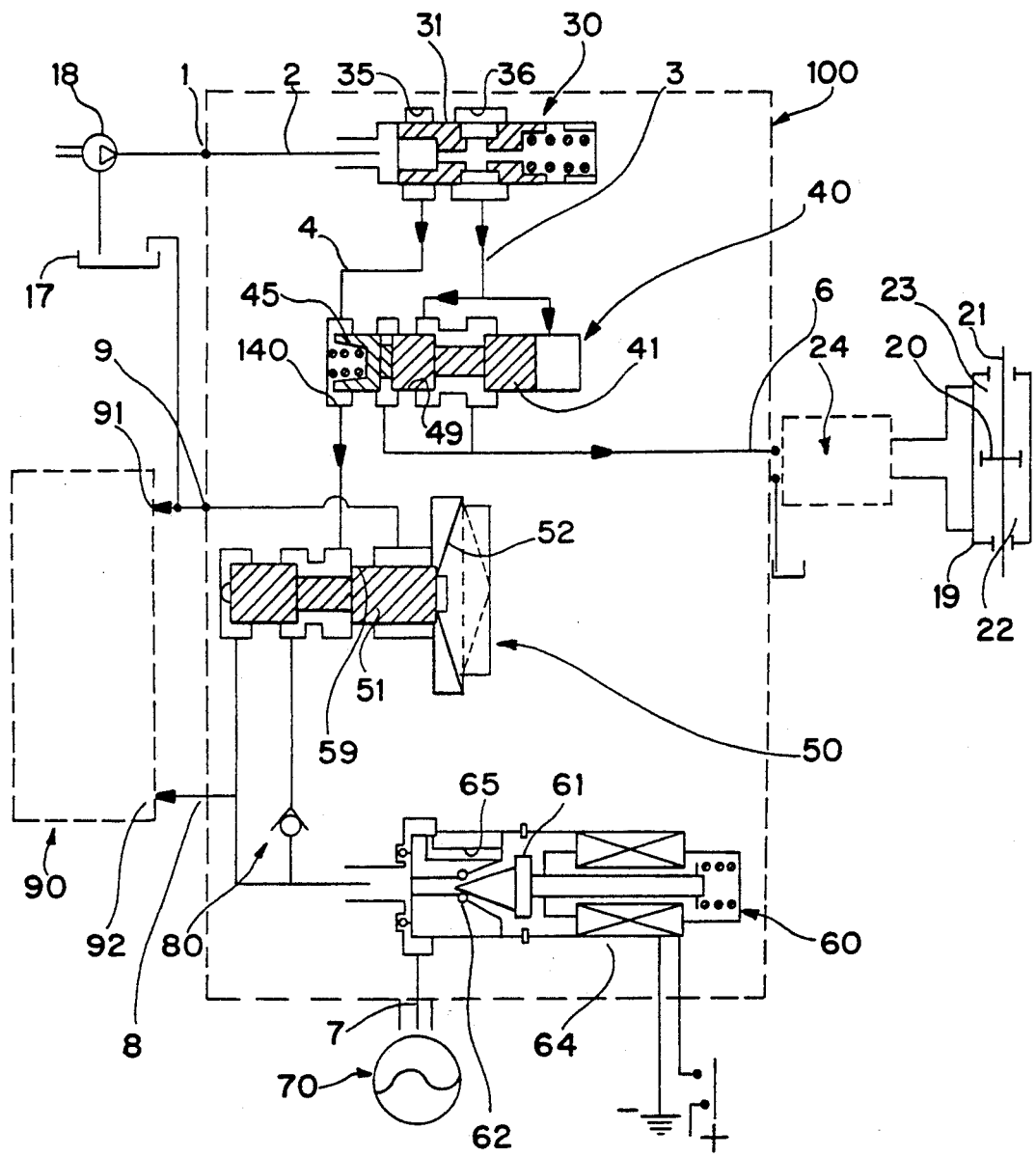
FIG. 2 is a diagrammatic view of the hydraulic fluid distribution means in accordance with the invention.

Referring to both FIGS. 1 and 2, the hydraulic power source of the power assisted steering system comprises a reservoir 17 and fluid pressurising means, for example a pump 18, for pressurising the hydraulic fluid in the reservoir 17. A hydraulic actuator 19 of the piston and cylinder jack type, has a piston 20 carrying a piston rod 21 which acts on the rack 15. Within the cylinder of the actuator 19, the piston 20 defines two chambers 22 and 23. A hydraulic distributor 24 is interposed between the pump 18 and the actuator 19, and is responsive to the angular offset between the two steering column shafts 13A and 13B, whereby to cause the actuator 19 to act on the steering arms 11 in the same direction as the steering control means 10.

The hydraulic distributor 24 may for example be of the kind comprising the following components arranged in stacked relationship in the axial direction: a first stator, a first rotor disc secured to one of the two steering column shafts 13A or 13B for rotation with it, a second rotor disc fixed to the other steering column shaft for rotation with the latter, and a second stator having series of hydraulic passages in the rotor discs for the supply of fluid to the actuator and for recovery of the fluid from the actuator. The fluid is then returned to the reservoir 17 of the hydraulic power source via the stators of the distributor 24. For more detail about the construction of such a distributor, reference is invited to, for example, the above mentioned French patent specification FR 2 448 472A which corresponds to U.S. Pat. No. 4,414,883, the disclosure of which is incorporated by reference in this description. It should be noted that in the present example the fluid concerned is the oil that supplies the distributor 24.

Apart from its steering system, the vehicle also includes a further installation which is hydraulically controlled or assisted. In the present example that installation consists of a clutch 93 having a clutch actuating mechanism 94 which is controlled or assisted by a hydraulic clutch servo unit 90. The clutch is of the kind comprising a reaction plate, a pressure plate, a diaphragm and a cover plate which is secured to the engine crankshaft for rotation with the latter. When the clutch is engaged, the pressure plate and reaction plate grip between them friction pads which are coupled to a hub, the latter being secured to the input shaft of the gearbox of the vehicle for rotation with this input shaft. The other installation referred to may, instead of or in addition to the clutch, consist of a gear changing mechanism associated with the gearbox or the like. Any of these installations may be controlled by the hydraulic servo unit 90, which may for example include a piston and a cylinder defining a control chamber which is supplied with hydraulic fluid under pressure.

In the present case this fluid is supplied from a hydraulic fluid distribution unit 100, FIG. 1. The hydraulic power source 17, 18 supplies hydraulic fluid under pressure to the servo unit 90 as well as to the hydraulic distributor 24 of the power assisted steering system, with the hydraulic fluid distribution unit 100 interposed between the hydraulic power source, i.e. the reservoir 17 and pump 18, and the distributor 24.

As shown in FIG. 2, the distribution unit 100 includes a flow distributing means in the form of a valve 30, which is fed with hydraulic fluid under pressure by the pump 18, through a feed line 2 via a fluid inlet 1 of the distributing unit 100. The distributing valve 30 has two outlets connected respectively to a main circuit 3 and a secondary circuit 4, the valve 30 being adapted to distribute the fluid received via the feed line 2 into the circuits 3 and 4 in proportions which are determined according to the position of the valve 30. The main output from the valve 30 is fed into the main circuit 3 for supplying the power assisted steering system, while its secondary output is fed into the secondary circuit 4 so as to supply fluid to the servo unit 90. A pressure regulating valve 40 is connected in the main circuit 3 and in the secondary circuit 4, for regulating the pressure of the main and secondary fluid flows in accordance with the hydraulic fluid demand of the power assisted steering system.

Figure 9:
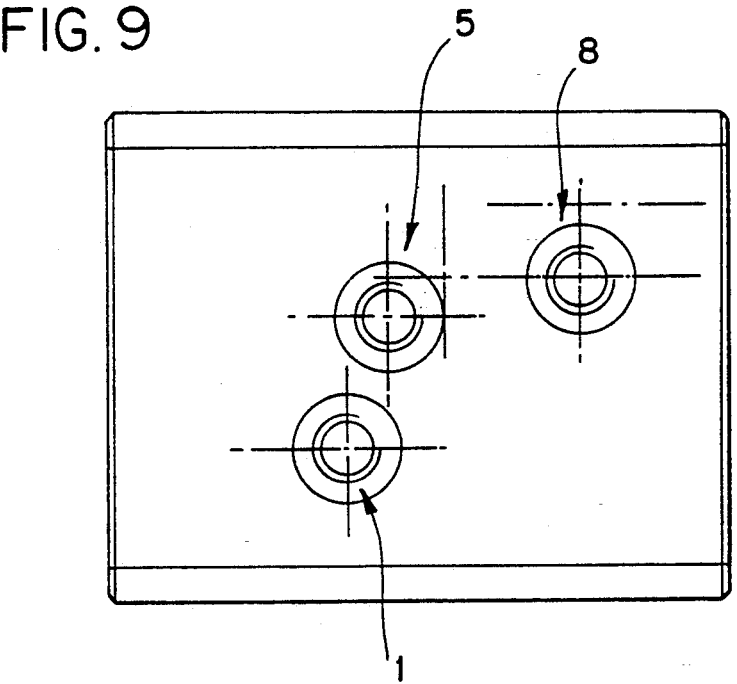
FIG. 9 is an external view as seen in the direction of the arrow 9 in FIG. 4.
Figure 10:
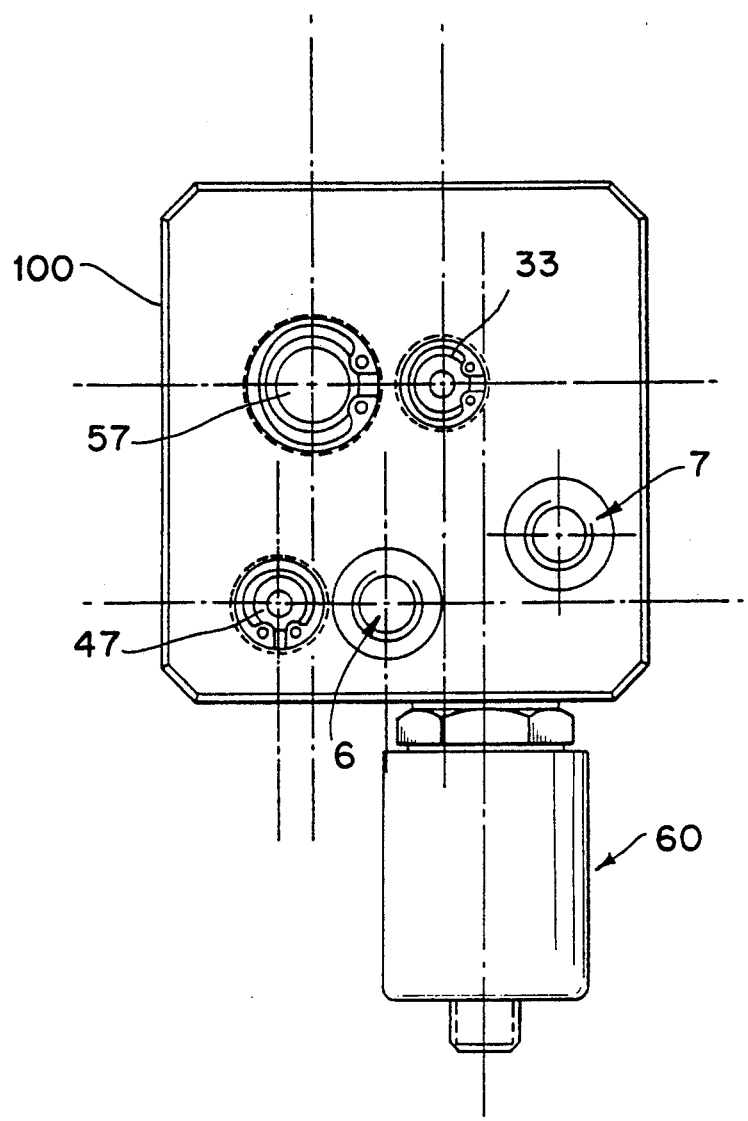
FIG. 10 is an external view seen in the direction of the arrow 10 in FIG. 4.

In the example now described, the hydraulic fluid distribution unit 100 is constructed so that its general external shape is that of a parallelepiped, as can be seen in FIGS. 9 and 10, i.e. it has a housing in the form of a block with two square ends and four rectangular sides. The flow distributing valve 30 and the pressure regulator 40 are housed within this block, together with a connecting/disconnecting device in the form of a valve 50 (referred to here as the connecting valve), a non-return valve 80, and an electric isolating valve 60. The valve 60 is connected through an inlet 7 of the distribution unit 100 to an external pressure accumulator 70, the purpose of the valve 60 being to isolate this accumulator 70. Besides the fluid inlets 1 and 7 already mentioned, the distribution unit 100 also has fluid ports 5, 6 and 8. The port 5 is an inlet port connected to the low pressure outlet 91 of the servo unit 90, and also connected to the reservoir 17. The port 6 is an outlet port which is connected to the distributor 24 of the steering system, while the port 8 is a high pressure output port connected to the high pressure inlet 92 of the clutch servo unit 90. The servo unit 90 may include a valve, not shown, for controlling the return of the hydraulic fluid to the reservoir 17.

It will of course be understood that the feed line 2, connecting the main fluid inlet of the hydraulic fluid supply distributing unit 100 to the outlet of the pump 18, consists of any suitable form of connection such as tubes, pipes or the like. The same is true for any of the connections between the various ports 5 to 8 and the various units 24, 70, 17, 90 to which they are connected. Each port in the housing of the unit 100 comprises a threaded hole in which an associated threaded connector can be fitted in order to attach the associated tube or the like.

The hydraulic fluid supply distribution unit 100 will now be described in greater detail with reference to FIGS. 3 to 10, and the term "the block" will be used to refer specifically to its housing or to the distributing unit itself, according to the context. The block 100 is formed with various passages, three of which define respective bores 39, 49, 59 which are parallel to each other and generally cylindrical. The axes of the bores 39 and 59 lie in a common horizontal radial plane, as is best seen in the plan view of FIG. 7. As shown in FIG. 4, the bore 49 lies below the bores 39 and 59. The movable, piston-type valve member, 31, of the flow distributing valve 30 is mounted in the bore 39. Similarly, the pressure regulator 40 consists of a piston valve having a movable valve member 41 mounted in the bore 49, while the connecting device 50 comprises another piston valve having a movable valve member 51 in the bore 59.

Figure 7:
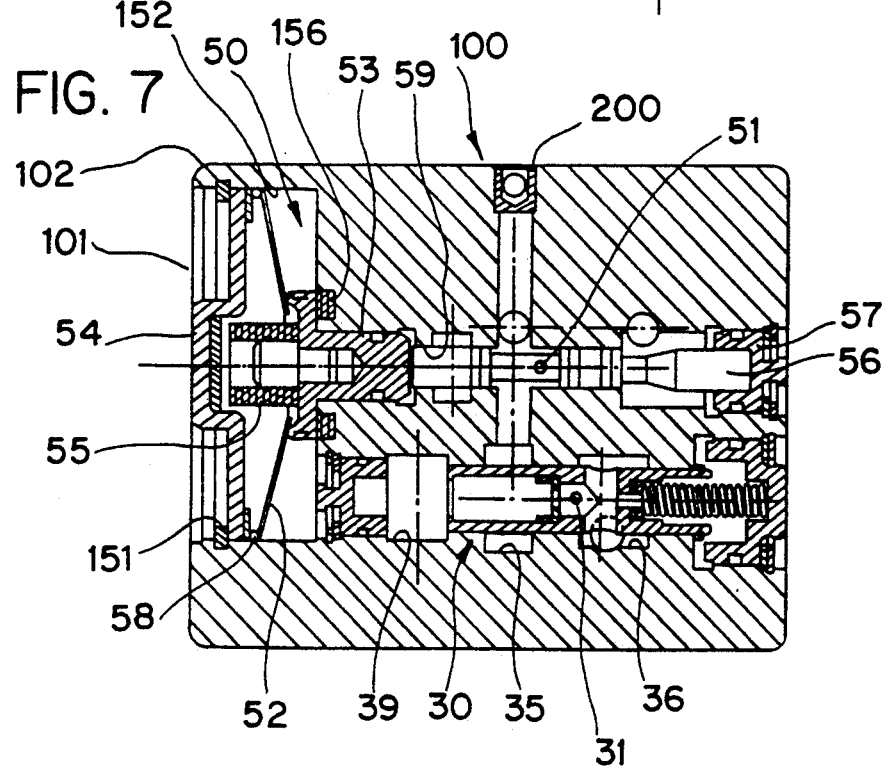
FIG. 7 is a cross sectional plan view taken on the line D—D in FIG. 5.
Figure 8:
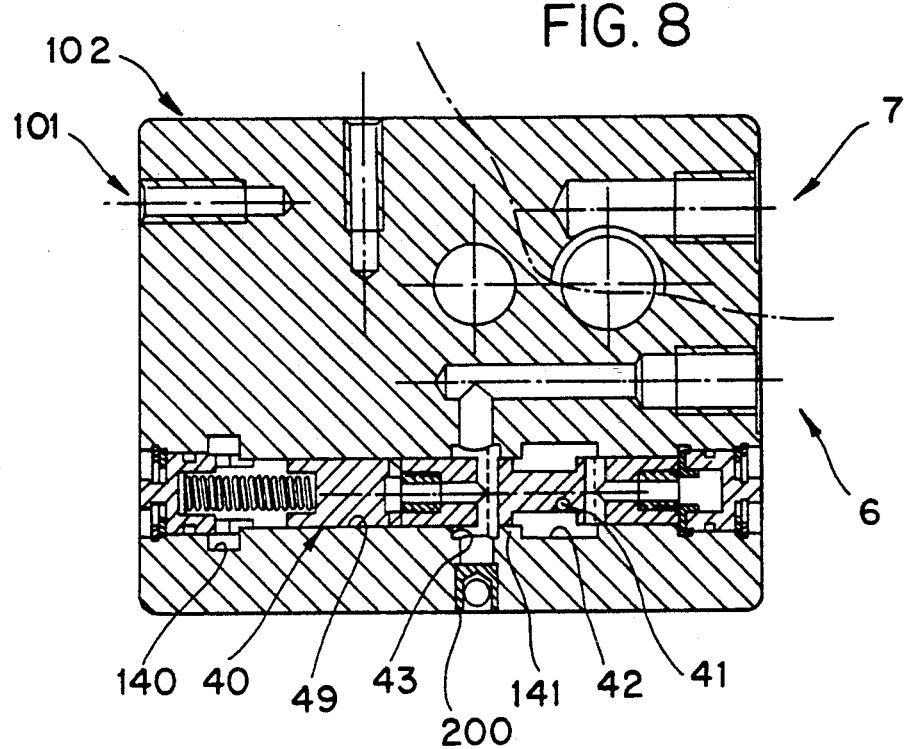
FIG. 8 is a cross sectional plan view taken on the line E—E in FIG. 4.

All of these valve members 31, 41 and 51 are matched in external profile to their associated bores 39, 49 and 59 respectively, and are therefore cylindrical, i.e. they have a circular cross section, their movement in the associated bore being axial. In each case the axial movement of the valve member selectively covers or uncovers appropriately placed annular grooves formed in the block 100 in a manner to be described below. In addition, the valve member 51 of the connecting valve 50 is similar in shape to the valve member 41 of the regulating valve 40, and comprises two end portions which are joined together by a central portion having a reduced diameter. The valve member 31 of the flow distributing valve 30 has a blind, T-shaped, internal passage which is open at its leading end as can be seen in FIG. 7, while as shown in FIG. 8, the valve member 41 has T-shaped passages formed in each of its end portions. The valve member 51 is generally solid.

The bore 39 is closed by means of two plug members 33 and 35 (FIG. 4), which in this example are formed at their inner ends with blind holes, with each plug member having a sealing ring at its outer end. Similar plug members 46 and 47, FIG. 4, are provided at the two ends of the bore 49. The bore 59 is closed by a similar plug member 57 at one of its ends. The other end of the bore 59 is closed by a cover plate 54. The various plug members 33, 35, 46, 47 and 57, and the cover plate 54, are retained against axial movement by means of circlips engaged in corresponding annular grooves formed in the block 100. The circlips are seen in FIGS. 3 and 10, but only the circlip 151 in FIG. 3, associated with the cover plate 54, is given a reference numeral.

Figure 3:
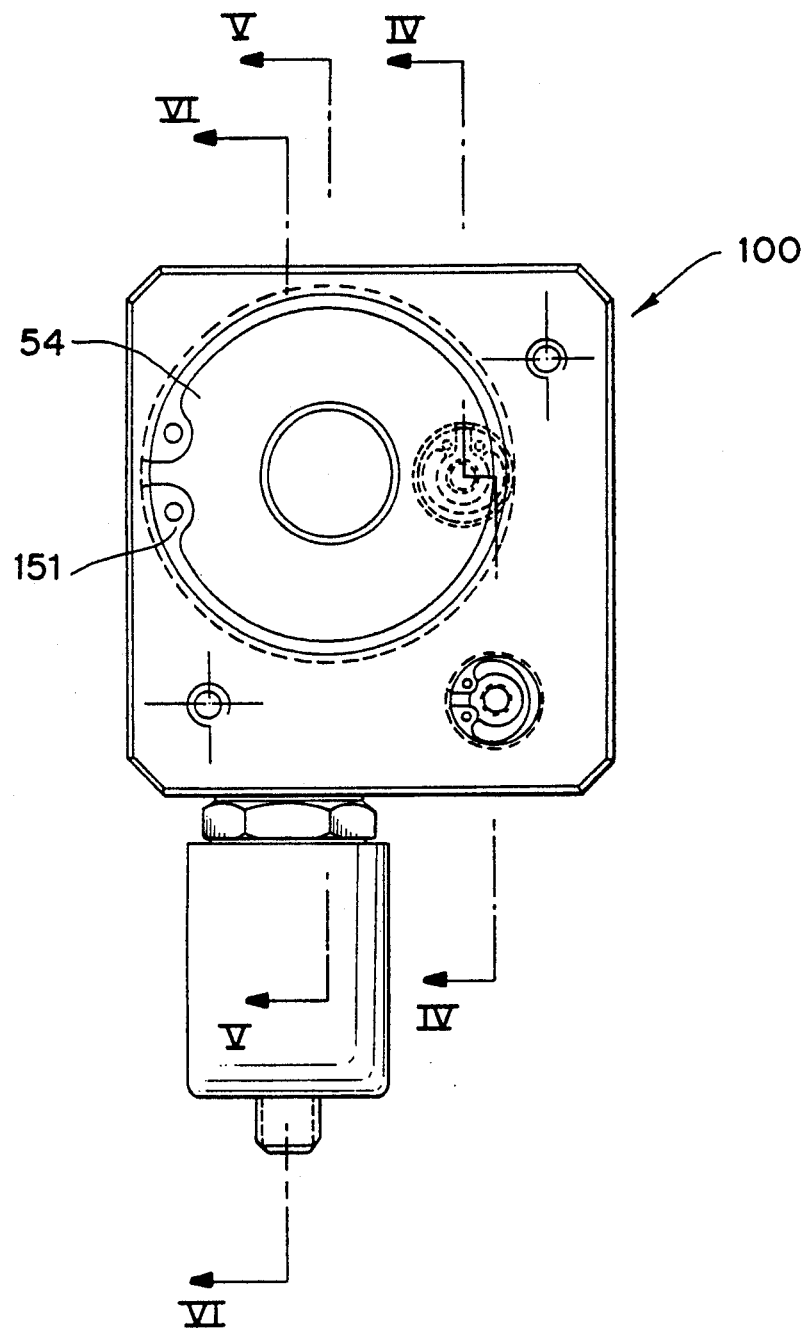
FIG. 3 is a view showing one of the faces of a block constituting the housing of the fluid distribution means.
Figure 4:
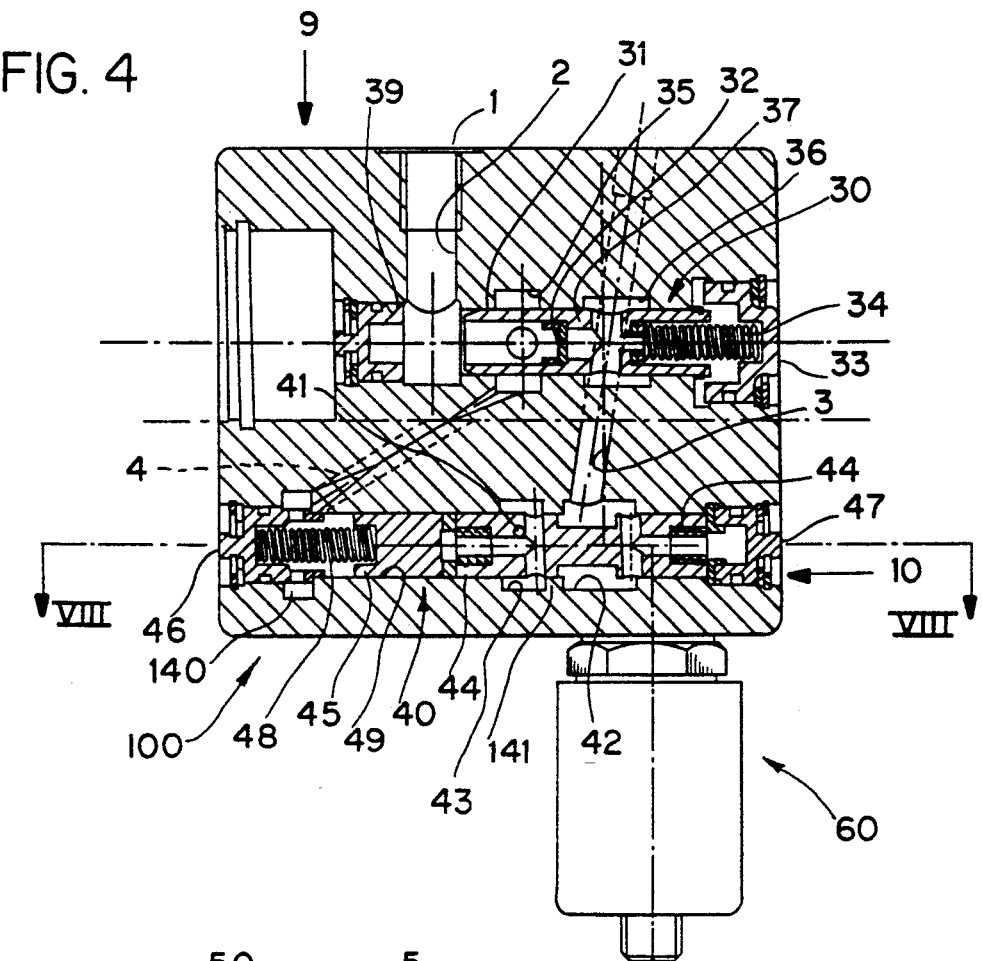
FIG. 4 is a cross sectional elevation taken on the line IV—IV in FIG. 3.
Figure 5:
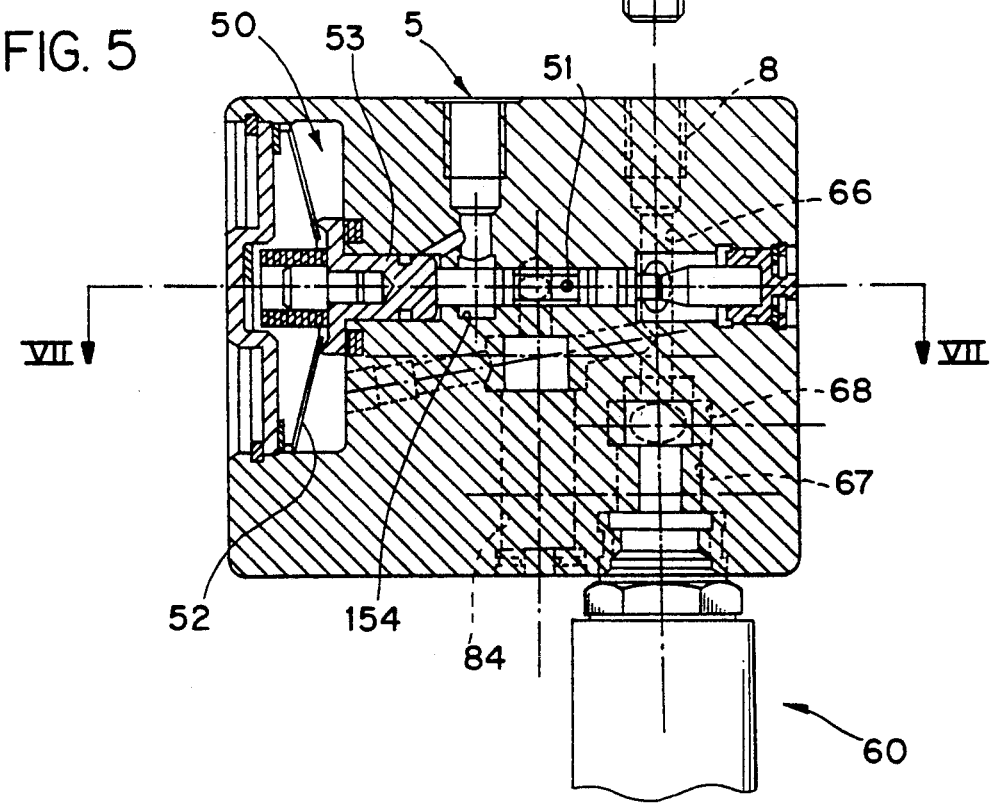
FIG. 5 is a cross sectional elevation taken on the line V—V in FIG. 3.

As can be seen in FIGS. 3, 4 and 7, the cover plate 54 is fitted in a generally cylindrical blind recess 152 formed in the block 100. This recess 152 is of large diameter, and the bores 39 and 59 are both open through its base or inner face. It will be appreciated that this arrangement facilitates manufacture of the block 100, by enabling the various passages to be made so that they extend right through the block from one side of it to the other. The passage that includes the bore 49 also extends right through the block, parallel to the bores 39 and 59.

It will however also be noted that the block 100 has further passages, which bring the various bores 39, 49 and 59, the non-return valve 80, and the isolating valve 60, variously into communication with each other. In order not to over-complicate the drawings, reference numerals have not been given to these additional passages. They are however all shown variously in FIGS. 3 to 10. They extend at right angles to the bores 39, 49 and 59, or in an inclined manner as can be seen especially in FIGS. 6 and 7. The presence of the large blind recess 152 facilitates drilling of these inclined passages in the block. The above mentioned additional passages are closed by suitable plug elements, which in this example include balls which retain the plug elements in position. See for example in FIG. 7, where one of these plug members is shown at 200, with its retaining ball engaged in a blind hole formed in the plug element.

Machining of the block 100 is generally facilitated by the arrangements described above. The block also has securing faces 101, 102 (see FIG. 8 for example), which are formed with threaded holes for accommodating studs for this purpose.

The flow distributing valve 30 comprises, besides its valve member 31, a resilient return means in the form of a coil spring 34, interposed axially between the plug member 33 and the valve member 31, FIG. 4. The spring 34 is engaged at one end in the blind hole in the plug member 33, and at its other end in an axial blind hole in the valve member 31.

The bore 39 is formed with two radial grooves 35 and 36, and is connected, adjacent to the leading end of the valve member 31 (i.e. the left hand end in FIGS. 2 and 4, remote from the plug member 33), with the inlet port 1 and thus with the feed line 2, the portion of which within the block 100 is shown in FIG. 4. The groove 35 communicates, through the secondary circuit 4 (FIGS. 2 and 4) with a radial groove 140 surrounding the bore 49 of the pressure regulator valve 40. The groove 36 communicates via the main circuit 3 with another radial groove, 42, of the bore 49. It will be noted that the valve member 41 of the pressure regulator valve 40 has a central portion of reduced diameter which lies within the radial groove 42.

The valve member 31 of the flow distributing valve 30 is hollow, so as to define an internal chamber in which a calibrated passage 32 is formed. The latter consists of a diaphragm having a central calibrated orifice and retained in the chamber within the valve member 31 between a retaining ring 37 and a shoulder formed in the bore of the valve member. For this purpose, it will be seen from FIG. 4 that the diameter of the internal chamber is smaller to the right of the diaphragm 32, and therefore smaller where level with the radial groove 36, than to the left of the diaphragm. The internal chamber of the valve member 31 is open at the leading end of the latter, and also at its rear end, where it is joined to a radial passage formed in the valve member and communicating with the radial groove 36.

The pressure regulator valve 40 is connected to the main circuit 3 and to the secondary circuit 4 via its radial grooves 42 and 140 as already described. Its valve member 41 is fitted at each end with a respective coaxial nozzle or jet 44. The jets 44 form the base of T-shaped passages which are formed within the valve member 41 in its axial end portions. The radial arm of the leading T-shaped passage communicates with a radial groove 43 of the bore 49, which in turn communicates with the inlet 6 and thence with the hydraulic fluid distributor 24 of the power assisted steering system (see FIG. 8). The radial arm of the T-shaped passage at the rear end of the valve member 41 opens into the radial groove 42, and therefore communicates via the main circuit 3 with the radial groove 36 of the flow distributing valve 30.

The radial grooves 42 and 43 are separated axially by an annular rib 141 projecting radially inwards. The valve member 41 is arranged to cover the radial grooves 42 and 43 to a greater or a lesser extent. Similarly, the valve member 31 is arranged to cover the radial groove 35 to a greater or lesser extent. The valve member 41 also closes the opening through the rib 141 so as to produce a throttling effect. In the rest position of the valve 40, the rib 141 is covered by the valve member 41, the position of the radial arms of its T-shaped passages being as seen in FIG. 4, i.e. with the leading one lying within the groove 43 and the rear one lying partly within the groove 42. In the condition of the distributing unit 100 shown in FIGS. 3 to 10, the valve member 41 is in its rest position. As can be seen, in this position the grooves 42 and 43 are out of communication with each other, while in operation, the pressure in the groove 42 is greater than that in the groove 43, thus causing the valve member 41 to move forward as a piston, so as to open the passage through the annular rib 141 and bring the groove 43 into communication with the groove 42. Due to the calibrated orifice in the diaphragm 32, the flow of hydraulic fluid into the groove 42 via the main circuit 3 is substantially constant.

The pressure regulating valve 40 also has a spool 45, and a return spring 48 which is mounted in the same way as the return spring 34 of the flow distributing valve 30, in an axial blind hole in the end of the spool 45 and in the blind hole in the plug member 46. The relative arrangement of the valve member 41 and spool 45 may be best understood with reference to FIG. 2, which shows diagrammatically that a chamber, connected via the outlet port 6 to the distributor 24 of the power steering system, is defined between the valve member 41 and the spool 45.

As seen in FIG. 4, the two valve members 41 and 31 are thus mounted for axial movement in opposite directions in their respective bores 49 and 39 under the action of their respective return springs 48 and 34. In addition, the spool 45, the plug member 46, and the radial groove 140 together define a further chamber which is in communication, via the secondary circuit 4, with the radial groove 35 in the bore 39.

This groove 35 is also connected, through a horizontal transverse passage formed in the block 100 and shown in FIG. 7, with the bore 59 of the connecting valve 50. The latter has a pilot valve member 51 which is arranged to abut at its leading end (the left hand end in FIG. 7) with one end of a shouldered slider 53 which engages a diaphragm 52. The rear or right hand end (FIG. 7) of the valve member 51 is arranged to abut against a nose piece 56, of resilient material, which is fitted in the blind hole of the plug member 57. The valve member 31 has a central portion of reduced diameter, sliding in a part of the bore 39 that is of corresponding diameter, so that the groove 35 communicates with the latter.

Figure 11:
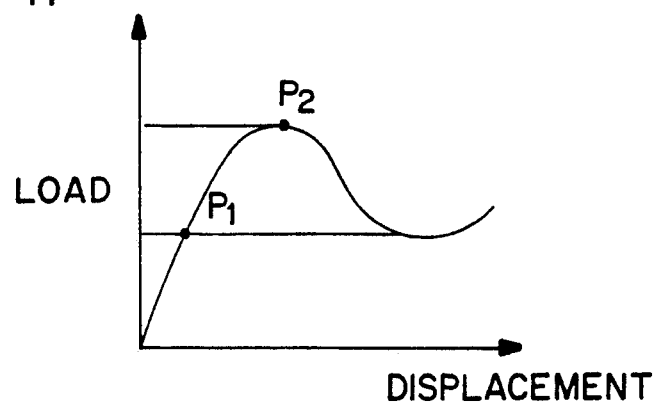
FIG. 11 shows the characteristic load/displacement curve of a connecting/disconnecting valve of the fluid distribution means.

The diaphragm 52 is in the form of an axially acting resilient ring, and has the characteristic load/displacement curve shown in FIG. 11. This curve is of saddlebacked shape, i.e. the force exerted by the Belleville ring shows a maximum at $P_2$, after which, with further displacement, the load decreases down to the value $P_1$. Thus in the load range $P_1$ to $P_2$, there are two possible displacements of the Belleville ring for a given value of the load. The diaphragm 52 has an outer peripheral portion which constitutes the Belleville ring proper, and which in this example bears on an annular thrust ring 58 which is retained in engagement with the rear face of the cover plate 54 by the circlip 151. The Belleville ring portion of the diaphragm 52 is extended centrally in a plurality of fingers separated from each other by radial slots opening into a central aperture of the diaphragm. In the present example the diaphragm is of the kind which is adapted to assume two distinct configurations.

The slider (or guide) 53 has a cylindrical body portion which slides in a cylindrical portion, of enlarged diameter, of the bore 59 at the leading end of the latter, with the body portion carrying at its leading end, within the blind recess 152, an actuating crown portion which engages on the ends of the fingers of the diaphragm 52. Extending forward from this crown is a spigot or nose for centring and carrying a tubular buffer 55 of resilient material for engaging against the central portion of the cover plate 54. The latter is recessed for this purpose, and a fixed ring, clearly seen in FIG. 7, is fitted within this recess. A sealing ring 156 is fitted in a circular groove formed in the block 100 on the rear side of the blind recess 152, and the rear face of the crown portion of the slider 53 seats against this sealing ring.

The bore 59 communicates with the reservoir 17, and also with the low pressure outlet 91 of the servo unit 90, via the inlet port 5 (see FIG. 2). For this purpose the bore 59 is formed with a radial groove 154, FIG. 5. The bore 59 also communicates with the non-return valve 80 and the groove 35 of the flow distribution valve 30, and with the outlet port 8 (and therefore with the high pressure inlet 92 of the clutch servo unit 90). Thus, the secondary circuit 4 has two branches, which meet in the groove 35, with one of these branches opening into the groove 140 and the other communicating with the central portion of the bore 59. The latter is in communication at one of its ends with the reservoir 17 via the radial groove 154, and at its other end with the outlet port 8 through a perpendicular duct (see FIGS. 5 and 7). The valve member 51 is thus well balanced, especially since the central portion of the bore 59 also communicates, through further ducts (FIGS. 5 and 7), with the non-return valve 80. The latter is shown in cross section in FIG. 6 and in broken lines in FIG. 5.

Figure 6:
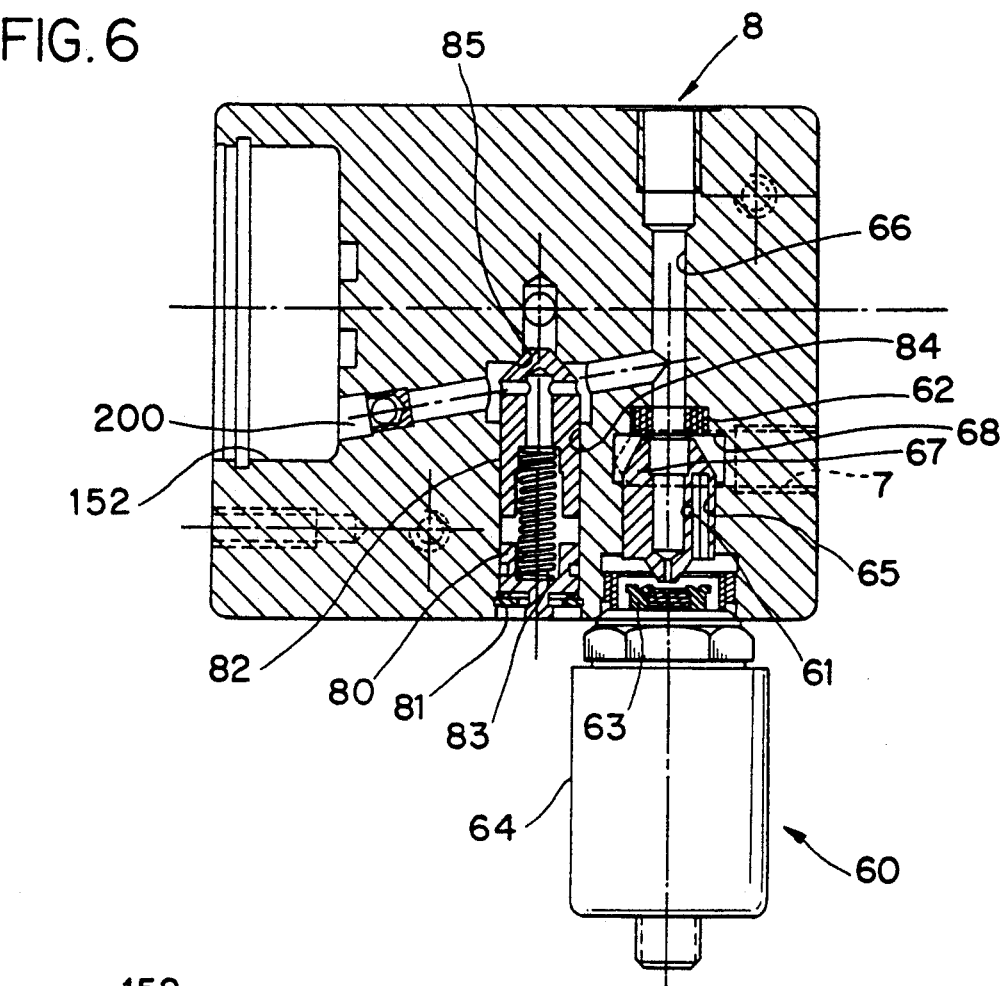
FIG. 6 is a cross sectional elevation taken on the line VI—VI in FIG. 3.

Referring now in particular to FIG. 6, both the non-return valve 80 and the electrical isolating valve 60 for isolating the accumulator 70, extend on axes which are generally at right angles to those of the flow distributing valve 30, pressure regulator valve 40 and connecting valve 50. The non-return valve 80 has a spool 82, the upper end of which is tapered. A T-shaped passage is formed within the spool 82, the latter being mounted within a cylindrical bore 84 formed in the block 100. The spool 82 is formed with a hole which is coaxial with the vertical branch of its T-shaped passage. A return spring 83 is mounted with one of its ends in this hole and with its other end in the blind hole formed in the inner face of a plug member 81, which is similar to the plug members 33 and 35 seen in FIG. 4.

The electrical isolating valve 60 includes an electromagnet with a solenoid 64 and a valve member 61 which is controlled by the electro-magnet for cooperation with valve seats 62 and 63. The solenoid 64 has a housing which is attached to the outside of the block 100 in a suitable sealing manner. The valve member 61 is formed with a calibrated duct 65, and is mounted in a bore 68 formed in the block 100. The bore 67 is in communication, through a radial groove 68, with the accumulator 70 (FIG. 2). It is also in communication with the outlet port 8 through a duct 66, which also communicates with the bore 59 of the connecting valve 50, through the spool 82 of the non-return valve. The spool 82 is biassed by the return spring 83 against a valve seat 85. The valve seat 62, which in this example is a separate seating member fitted in a recess formed in the block 100, is delimited by the radial groove 68 of the isolating valve; and the tapered leading end of the valve member 61, with the open end of the calibrated duct 65 formed in it, penetrates into the radial groove 68. The duct 65 extends longitudinally from one end of the valve member 61 to the other.

The distribution unit 100 operates in the following way. The solenoid 64 is supplied with current by the battery of the vehicle (FIG. 2). When the engine is stopped, the solenoid 64 is not energized, and the isolating valve member 61 is engaged on the valve seat 62 by virtue of the pressure prevailing in the accumulator 70 and therefore, via the calibrated duct 65, also prevailing at the rear end of the valve member 61. This pressure thus closes the valve member 61 against the seat 62 and isolates the accumulator 70.

When the engine is started, the ignition key of the vehicle causes the solenoid 64 to be energised, so retracting the valve member 61 from the seat 62 so that the accumulator 70 then supplies hydraulic fluid under pressure to the servo unit 90 via the duct 66 and outlet port 8. At the same time, the pump 18 is started by the engine of the vehicle, and delivers hydraulic fluid into the feed line 2 and thence into the bore 39 of the flow distributing valve 30, which accordingly distributes the fluid between the main circuit 3 and secondary circuit 4, the leading end of the valve member 31 bringing the feed line 2 into communication with the main circuit 3 via the radial groove 36, with the return spring 34 being compressed. A substantially constant flow of hydraulic fluid is thus established in the main circuit 3 by virtue of the diaphragm 32. The pressure prevailing in the chamber constituted by the radial groove 42 of the pressure regulator valve 40 (FIG. 4) then becomes greater than that prevailing in the adjacent chamber defined by the radial groove 43. Therefore, as has been described above, the valve member 41 opens so as to bring the chambers 42 and 43 into communication with each other, thus releasing hydraulic fluid to the hydraulic distributor 24 of the power assisted steering system. In this condition, the spool 45 of the valve 40 is held close to the plug member 46, with the associated return spring 48 being compressed. At the same time, the pressure regulator valve 40 causes the connecting valve 50, and thence the servo unit 90, to be supplied with hydraulic fluid from the feed line 2.

When the driver of the vehicle applies braking to the road wheels, the pressure in the chamber 42 increases, so that the aperture through the rib 141, affording passage to the hydraulic fluid between the chambers 42 and 43, increases steadily so as to provide an increasing fluid flow into the distributor 24, with the spool 45 again being held close to the plug member 46.

When the pressure in the chamber defined by the radial groove 140, FIG. 4, becomes too large, the spool 45 is thereby urged to the right as seen in FIG. 4, thus pushing the valve member 41 back towards the plug member 47. The passage between the chambers 42 and 43 is thus closed. Similarly, when the fluid flow from the pump becomes too low, the valve member 31 is urged by the return spring 34 to the left as seen in FIG. 4, so that the radial groove 35 is covered by the valve member 31: the secondary circuit 4 is now isolated from the feed line 2. The whole of the fluid flow delivered by the pump now passes into the main circuit 3.

The secondary circuit 4 enables the accumulator 70 to be recharged, by virtue of the connecting valve 50 communicating with the radial groove 35, with the diaphragm 52 holding the valve member 51 in engagement against the nose piece 56, FIG. 7. The valve member 51 then interrupts communication with the reservoir 17. As the pressure increases, the slider or guide 53 is urged to the left as seen in FIG. 7, towards the cover plate 54, until the buffer 55 makes contact with the cover plate 54. As this happens, the diaphragm 52 deforms by flipping over so as to change the direction of its concavity (as indicated diagrammatically in broken lines in FIG. 2). Communication is thus established with the reservoir 17 via the port 5.

It will be noted that the non-return valve 80 enables the accumulator 70 to be charged, but does not allow it to be discharged into the central portion of the bore 59 in communication with the pressure regulator valve 40.

The servo unit 90 is thus supplied with hydraulic fluid under pressure, its pressure varying between two limits determined by the diaphragm 52, with the latter deforming or flipping over once the pressure becomes too large to ensure communication with the reservoir 17, and then returning to its initial position in order to close off communication with the reservoir 17. The pressure subsequently becomes reduced, and the diaphragm is restored to its original configuration by inversion, so pushing the valve member 51 to the right as seen in FIG. 7 and closing off communication with the reservoir 17. The movement of the valve member 51 takes place without any impact, by virtue of the resilient stop elements 55 and 56.

As will have been gathered from the foregoing, the power assisted steering system takes priority, and the accumulator 70 runs no risk of being discharged when the vehicle is at rest. However it enables hydraulic fluid to be supplied under pressure as soon as the vehicle is set in motion.

In all cases, the movement of the valve members 31 and 51 takes place against the action exerted by the resilient return means 34, 52. The same is true of the spool 45, working against the return spring 48, the various movements of the valve members 31, 51 and spool 45 being controlled by the variations in fluid pressure. The characteristics of the various resilient components 34, 52 and 48 are chosen accordingly, having regard to the particular application to which the system is to be put.

Referring once again to FIG. 11, this shows on the ordinate the load exerted by the diaphragm 52 on the slider or guide 53, while the abscissa represents the axial movement of the guide 53. The diaphragm 52 thus normally exerts a force $P_1$ on the valve member 51, and as the pressure increases in the servo unit 90, the load exerted by the diaphragm increases up to its maximum value $P_2$. Beyond this point, the diaphragm inverts and the pressure diminishes, until the diaphragm 52 inverts once again when the load reaches the value $P_1$ (chosen in this example so as to correspond to the lower part of the curve).

As will be understood from the foregoing, a pump 18 suitable for use in the system according to the invention is one that enables a hydraulic fluid flow to be provided greater than that normally provided for the power assisted steering system.

The present invention is of course not limited to the embodiment described above. In particular, the secondary circuit 4 may comprise only a single branch, with the radial groove 140 then communicating with the central portion of the bore in the valve member 51 (FIG. 2). The various bores, valve members and spools may be either cylindrical or of square cross section. The diaphragm 52 may have any suitable configuration that enables it to invert.

What is claimed is:

1. A fluid supply apparatus for a motor vehicle having steering control means, hydraulic steering assistance means for providing steering assistance to and associated with the steering control means and comprising a hydraulic fluid source, a hydraulic distributor and means connecting the fluid source to the distributor for supplying the distributor with fluid under pressure, the vehicle also having a further hydraulically operated actuating mechanism, servo means associated with the actuating mechanism for assisting in operation of said actuating mechanism, and fluid supply apparatus connected between said fluid source, and both the hydraulic distributor and said servo means, the fluid supply apparatus comprising a hydraulic fluid distribution unit for selectively distributing fluid under pressure to the hydraulic distributor and the servo means, said distribution unit comprising a main circuit, a secondary circuit, flow distribution means connected between the fluid source and the main and secondary circuits for dividing the flow of fluid received from said source between the main circuit and the secondary circuit, the main circuit being connected with the hydraulic distributor whereby to supply the steering assistance means and the secondary circuit being connected with said servo means, the distribution unit further comprising a pressure regulating means connected to the main and secondary circuits for regulating the pressure of the fluid flow in said circuits in response to the demand of the steering assistance means, wherein said pressure regulating means comprises bore means for defining a second bore, a second valve member being movable axially in the second bore, and means for connecting the second bore with the main circuit for connection to said fluid distributor.

2. Fluid supply apparatus for a motor vehicle according to claim 1, wherein said flow distributing means comprises aperture means for defining a first bore, a first valve member mounted for axial movement in the first bore, and a return spring mounted in the first bore and engaging the first valve member, together with connecting means for connecting the first valve member with the fluid source.

3. Fluid supply apparatus for a motor vehicle according to claim 2, wherein the first valve member has an internal passage and means defining a calibrated orifice within said passage for setting a predetermined value of fluid flow circulating in the main circuit.

4. Fluid supply apparatus for a motor vehicle according to claim 1, wherein the second bore is formed with a first groove communicating with said main circuit and, through the main circuit, with the flow distributing means, a second groove for communicating with the said fluid distributor, and projecting element separating said first and second grooves from each other and defining a portion of the said second bore with the second valve member extending through it, whereby the second valve member is adapted to selectively cover the projecting element so as selectively to bring the first and second grooves into communication with each other.

5. Fluid supply apparatus for a motor vehicle according to claim 1, wherein the pressure regulating means further includes a spool and a return spring for acting on the spool.

6. Fluid supply apparatus for a motor vehicle according to claim 5, wherein each of said first and second bores is formed with two grooves, with said main circuit connecting two of said grooves together while said secondary circuit connects the other two grooves together.

7. Fluid supply apparatus for a motor vehicle according to claim 1, further including connecting/disconnecting means and means putting the pressure regulating means in communication with the connecting/disconnecting means.

8. Fluid supply apparatus for a motor vehicle according to claim 7, wherein said connecting/disconnecting means comprise means defining a third bore, means putting the third bore in communication with said pressure regulating means, and a third valve member mounted for axial movement in the third bore, and wherein the apparatus further includes a non-return valve device, a pressure accumulator, and means for connecting the non-return valve device with the pressure accumulator, said reservoir and said servo means.

9. Fluid supply apparatus for a motor vehicle according to claim 8 including return means for connecting the third bore to said reservoir, wherein the connecting/disconnecting means further includes a resilient diaphragm coupled to the third valve member and adapted to adopt either one of two configurations selectively, namely a first configuration in which the third valve member closes said return means so as to disconnect the third bore from the reservoir and to enable the accumulator to be recharged through the non-return valve device while also bringing said secondary circuit into communication with the servo means so that the secondary circuit is supplied with hydraulic fluid under pressure, and a second configuration in which the third valve member brings the reservoir into communication with the third bore and brings about a reduction in pressure.

10. Fluid supply apparatus for a motor vehicle according to claim 9 having means for bringing said accumulator and non-return valve device into communication with each other, and further comprising an electrical isolating valve interposed between the non-return valve device and said pressure accumulator, isolating valve being adapted to close the means connecting the accumulator and non-return valve device when the engine of the vehicle is stopped.

11. Fluid supply apparatus for a motor vehicle according to claim 1, wherein the hydraulic fluid distribution unit comprises a block of parallelepiped shape defining three mutually parallel bores therein, with a respective valve member being mounted in each said bore to constitute with its bore, respectively, a flow distributing means, a pressure regulating means, and a connecting/disconnecting means.

12. Fluid supply apparatus for a motor vehicle according to claim 11, further comprising a non-return valve device and an electrical isolating valve, said block further having means defining, at right angles to the three said bores, a housing mounting the non-return valve device and the electrical isolating valve respectively.

13. A fluid supply apparatus for a motor vehicle having:
- a steering control means for steering said vehicle;
- a hydraulic steering assistance means for providing steering assistance to and associated with the steering control means, said steering assistance means comprising:
  - a hydraulic fluid source;
  - a hydraulic distributor; and
  - a means connecting the fluid source to the distributor
- for supplying the distributor with fluid under pressure; the vehicle also having:
- a further hydraulically operated actuating mechanism;
- a servo means associated with the actuating mechanism for assisting in operation of said actuating mechanism; and
- a fluid supply apparatus connected between said fluid source and both the hydraulic distributor and said servo means, the fluid supply apparatus comprising a hydraulic fluid distribution unit for selectively distributing fluid under pressure to the hydraulic distributor and the servo means, said distribution unit comprising:
  - a main circuit;
  - a secondary circuit;
  - a flow distribution means connected between the fluid source and the main and secondary circuits for dividing the flow of fluid received from said source between the main circuit and the secondary circuit, the main circuit being connected with the hydraulic distributor whereby to supply the steering assistance means and the secondary circuit being connected with said servo means; and
  - a pressure regulating means connected to the main and secondary circuits for regulating the pressure of the fluid flow in said circuits in response to the demand of the steering assistance means,
wherein said pressure regulating means comprises bore means for defining a second bore, a second valve member being movable axially in the second bore, and means for connecting the second bore with the main circuit for connection to said fluid distributor.

* * * * *

UNITED STATES PATENT AND TRADEMARK OFFICE
CERTIFICATE OF CORRECTION

PATENT NO. : 5,293,952

DATED : March 15, 1994

INVENTOR(S) : LEDAMOISEL, et al.

It is certified that error appears in the above-identified patent and that said Letters Patent is hereby corrected as shown below:

Please note that in the title the word <u>value</u> should be "valve".

The title for this patent should read as follows:

HYDRAULIC FLUID SUPPLY SYSTEM FOR AN INSTALLATION IN A MOTOR VEHICLE HAVING POWER ASSISTED STEERING WITH A PRESSURE REGULATION VALVE CONNECTED TO THE MAIN AND SECONDARY CIRCUITS

Signed and Sealed this

Nineteenth Day of July, 1994

Attest:

BRUCE LEHMAN

Attesting Officer          Commissioner of Patents and Trademarks